US009683152B2

(12) United States Patent
Kelch et al.

(10) Patent No.: US 9,683,152 B2
(45) Date of Patent: Jun. 20, 2017

(54) STRUCTURAL POLYURETHANE ADHESIVE (71) Applicant: SIKA TECHNOLOGY AG, Baar (CH)

(72) Inventors: Steffen Kelch, Oberengstringen (CH); Wolfgang Roock, Appen (DE); Florian Ittrich, Pinneberg (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/423,442

(22) PCT Filed: Aug. 20, 2013

(86) PCT No.: PCT/EP2013/067345
§ 371 (c)(1),
(2) Date: Feb. 24, 2015

(87) PCT Pub. No.: WO2014/029787
PCT Pub. Date: Feb. 27, 2014

(65) Prior Publication Data
US 2015/0240139 A1 Aug. 27, 2015

(30) Foreign Application Priority Data

Aug. 24, 2012 (EP) ..................................... 12181776

(51) Int. Cl.
*C09J 175/12* (2006.01)
*B32B 37/12* (2006.01)
(Continued)

(52) U.S. Cl.
CPC ............... *C09J 175/12* (2013.01); *B32B 7/12* (2013.01); *B32B 37/12* (2013.01); *C08G 18/10* (2013.01);
(Continued)

(58) Field of Classification Search
CPC .... C08G 18/10; C08G 18/12; C08G 18/6529; C08G 18/6685; C08G 18/3206;
(Continued)

(56) References Cited

U.S. PATENT DOCUMENTS

2009/0035506 A1* 2/2009 Pind ................... C08G 18/3215
428/73
2012/0295104 A1* 11/2012 Barker ................ C08G 18/089
428/344
2014/0203024 A1 7/2014 Demmig

FOREIGN PATENT DOCUMENTS

| CN | 101151290 A | 3/2008 |
| EP | 0504681 A1 | 9/1992 |
| EP | 1690880 A1 | 8/2006 |

OTHER PUBLICATIONS

Office Action dated Mar. 15, 2016 corresponding to European Patent Application No. 13 756 016.5, 6 pages.
(Continued)

*Primary Examiner* — Thao T. Tran
(74) *Attorney, Agent, or Firm* — Dentons US LLP (57) ABSTRACT A two-component polyurethane adhesive is described. The polyurethane adhesive has high strength and extensibility, wherein the mechanical properties are only slightly dependent on the temperature. The polyurethane adhesive is suitable as a structural adhesive that is decomposed by heating in such a way that adhesive bonds can be undone in a temperature range of interest. The adhesive can include a triol, a diol, an alkoxylated aromatic diol, a polyamine, a polyisocyanate, and a polyurethane polymer having isocayanate groups in certain ratios.

14 Claims, 1 Drawing Sheet (51) Int. Cl.
| | | |
|---|---|---|
| *C09J 175/04* | (2006.01) | |
| *B32B 7/12* | (2006.01) | |
| *C08G 18/48* | (2006.01) | |
| *C08G 18/10* | (2006.01) | |
| *C08G 18/12* | (2006.01) | |
| *C08G 18/32* | (2006.01) | |

(52) U.S. Cl.
CPC ......... *C08G 18/12* (2013.01); *C08G 18/3206* (2013.01); *C08G 18/3215* (2013.01); *C08G 18/3225* (2013.01); *C08G 18/4829* (2013.01); *C08G 18/4879* (2013.01); *C09J 175/04* (2013.01); *B32B 2037/1253* (2013.01); *B32B 2305/08* (2013.01); *B32B 2375/00* (2013.01); *C09J 2475/003* (2013.01); *Y10T 428/31551* (2015.04)

(58) Field of Classification Search
CPC ............ C08G 18/3215; C08G 18/3225; C08G 18/4829; C08G 18/4879; B32B 2037/1253; B32B 2305/08; B32B 2375/00; B32B 2375/1269; B32B 37/12; B32B 7/12; C09J 175/04; C09J 175/12; C09J 2475/003; Y10T 428/31551

USPC ......... 428/423.1, 423.5, 423.7, 424.2, 425.1, 428/425.5, 425.8; 528/59, 60, 67; 156/60

See application file for complete search history.

(56) References Cited

OTHER PUBLICATIONS

English Translation of Office Action dated Mar. 15, 2016 corresponding to European Patent Application No. 13 756 016.5, 3 pages.
English Translation of International Search Report dated Feb. 1, 2014 corresponding to International Patent Application No. PCT/EP2013/067345, 2 pages.
English Translation of International Preliminary Report on Patentability dated Feb. 24, 2015 corresponding to International Patent Application No. PCT/EP2013/067345, 7 pages.
Office Action and English Translation of the Office Action dated Jul. 18, 2016 corresponding to Chinese Patent Application No. 201380041184.X, 20 pages.

* cited by examiner

STRUCTURAL POLYURETHANE ADHESIVE

CROSS-REFERENCE TO PRIOR APPLICATIONS

This application is a National Stage of PCT/EP2013/067345, filed Aug. 20, 2013, and designating the United States (published on Feb. 27, 2014, as WO 2014/029787A1), which claims priority under 35 U.S.C. §119 to European Patent Application No. 12181776.1, filed Aug. 24, 2012, each hereby expressly incorporated by reference in its entirety and each assigned to the assignee hereof.

TECHNICAL FIELD

The invention relates to the field of two-component polyurethane adhesives, in particular structural polyurethane adhesives.

PRIOR ART

Two-component polyurethane compositions based on polyols and polyisocyanates have long been used as elastic adhesives. They cure quickly after mixing and can therefore absorb and transmit forces after a short time.

Structural adhesives, also called construction adhesives or assembly adhesives, are used in the manufacturing industry to bond components together in such a way that the adhesive bond is part of a permanently load-bearing construction. Such adhesives are typically visco-plastic and must meet high demands in terms of processability, strength and adhesion forces.

For many bonded constructions, it is important that the adhesive has a uniform strength to the extent possible, for example, a uniform modulus of elasticity to the extent possible, over the entire range of its usage temperature, especially in the temperature range of about −35° C. to about +85° C., so that the mechanical behavior of the adhesive bond suitably may be incorporated into the calculation of the construction. Desired are in particular visco-plastic adhesives having high strength and high extensibility, in which the mechanical properties are not very dependent on the temperature. These adhesives are to be easily processed, usable also at higher layer thicknesses up to 10 millimeters and more, curable without problems to the final strength both at ambient temperature and in a curing process accelerated by heat, and show excellent bonding to metallic and non-metallic substrates. Further, there is a need for adhesives that have the aforementioned properties and also, in the cured state, can be easily detached again from the substrate to which they adhere by a specific treatment, without the substrate being damaged by this treatment, i.e., the bond connection can be detached without damage to the bonded components.

DISCLOSURE OF THE INVENTION

The object of the present invention is therefore to provide a polyurethane adhesive having high strength and high extensibility, in which the mechanical properties are not very dependent on the temperature, and which is therefore excellently suited as a structural adhesive, and which can be detached again from the substrate to which it adheres in the cured state in a manner that is not damaging to the substrate.

It has surprisingly been found that a polyurethane adhesive according to claim 1 achieves this object. Due to its special composition, the adhesive has good processability as well as high stability after the components are mixed, good initial adhesive strength, quick and problem-free curing, and very high strength in the cured state, without losing any of its extensibility and elasticity.

The achieved combination of strength and elongation across an application range of −35° C. to 85° C. is related to an increased impact strength of the cured material.

Particularly surprising in this context is the fact that adhesive bonds comprising the cured polyurethane adhesive can be detached again by heating to a temperature of at least 120° C., in particular to a temperature in the range of 140° C. to 200° C. for at least 10 minutes, in particular at least 20 minutes, i.e., the adhesive can be detached from the substrate. The temperature range in which debonding occurs is very advantageous. It is well above the usage temperature of many adhesive bonds, yet it is so low that many substrates of interest or bonded components are not damaged in their function by the debonding process. This advantageous behavior is achieved at least partially by the alkoxylated aromatic diol.

It was also found that using the polyurethane adhesive according to the invention achieves particularly good adhesion to metallic surfaces and non-metallic materials, in particular fiber-reinforced composites such as glass fiber-reinforced plastic materials and carbon fiber-reinforced plastic materials.

Further aspects of the invention are the subject of further independent claims. Particularly preferred embodiments of the invention are subject matter of the dependent claims.

WAYS OF CARRYING OUT THE INVENTION

The invention relates to a polyurethane adhesive composed of a first and a second component, wherein
the first component contains
 a) at least one triol A1 having a molecular weight in the range of 1,000 to 10,000 g/mol,
 b) at least one diol A2 having two primary hydroxyl groups and a molecular weight in the range of 60 to 150 g/mol, and
 c) at least one alkoxylated aromatic diol A3 having a molecular weight in the range of 300 to 1,000 g/mol, and
 d) at least one aliphatic polyamine A4 having a molecular weight in the range of 60 to 500 g/mol; and
the second component contains
 e) at least one polyisocyanate B1 and
 f) at least one polyurethane polymer B2 having isocyanate groups;
wherein the triol A1, the diol A2 and the alkoxylated aromatic diol A3 are present in such an amount that
 g) the weight ratio A1/(A2+A3)≤10, and
 h) the weight ratio A1/A2≤15.

In the present document, the prefix "poly" in substance names such as "polyol", "polyisocyanate", "polyether" or "polyamine" indicates that the respective substance, per molecule, formally contains more than one functional group occurring in its name.

In the present document, "molecular weight" in the case of polymers always refers to the average molecular weight.

A "primary hydroxyl group" denotes an OH group that is bound to a carbon atom having two hydrogens.

In this document, the term "phase separation" describes the process of segregation of highly ordered ("crystalline") regions, also called "hard segments", and poorly ordered ("amorphous") regions, also called "soft segments", during the curing of the polyurethane adhesive.

In this document, "open time" refers to the time within which the parts to be bonded must be joined together after the components have been mixed.

In the present document, the term "strength" refers to the strength of the cured adhesive, wherein strength in particular shall be understood to mean the tensile strength and the modulus of elasticity (Young's modulus) in the elongation range up to 10%.

In the present document, "adhesive bond" refers to a fixed connection of at least two substrates composed of the same material or different materials by way of an adhesive.

In the present document, "debonding" of an adhesive bond refers to the deliberate weakening of the adhesive with respect to the strength thereof. This enables the mechanical separation of the substrates with relatively little expenditure of force, i.e., the adhesive bond is easily detachable. Separating can be done either adhesively between the adhesive and a substrate surface or cohesively in the adhesive.

In the present document, "room temperature" refers to a temperature of 23° C.

The term "storage-stable" refers to the property of a composition of being storable in a suitable container for several weeks to several months at room temperature, without significantly changing the application or use properties thereof due to storage.

Suitable triols A1 are in particular polyoxyalkylene triols, also called polyether triols. These are polymerization products of ethylene oxide, 1,2-propylene oxide, 1,2- or 2,3-butylene oxide or mixtures thereof. Typically, they are polymerized using a starter molecule having three active hydrogen atoms, such as glycerol, 1,1,1-trimethylolethane, 1,1,1-trimethylpropane or mixtures thereof.

Preferred triols A1 are polyoxypropylene triols, polyoxyethylene triols and polyoxypropylene-polyoxyethylene triols.

Particularly preferably, the triol A1 has primary hydroxyl groups. In this way, the polyurethane adhesive is less prone to undesired reactions of isocyanate groups with potentially present water, which can lead to the formation of bubbles and incomplete curing.

Particularly preferred triols A1 are so-called "EO-endcapped" (ethylene oxide-endcapped) polyoxypropylene triols. The latter are special polyoxypropylene-polyoxyethylene triols which are obtained, for example, by further alkoxylating pure polyoxypropylene triols with ethylene oxide following the completion of the polypropoxylation, and therefore have primary hydroxyl groups. Compared with pure polyoxyethylene triols, they have the advantage that they are less hydrophilic and that they are liquid at room temperature.

Preferably, the triol A1 has a mean OH functionality in the range of 2.2 to 3. Using such triols A1, adhesives having good mechanical properties are obtained.

Preferably, the triol A1 has a molecular weight in the range of 3,000 to 8,000 g/mol, particularly preferably 4,000 to 6,000 g/mol. Such a triol exhibits a good combination of high functionality and chain length, so that an adhesive having good mechanical properties is obtained.

The triol A1 is preferably used in an amount of 30 to 70% by weight, based on the total weight of the first component.

Suitable diols A2 are in particular 1,2-ethanediol, 1,3-propanediol, 1,4-butanediol, 1,5-pentanediol, 1,6-hexanediol, 1,3-cyclohexanedimethanol, 1,4-cyclohexanedimethanol and diethylene glycol. These diols have primary hydroxyl groups that are not very sterically hindered and are particularly reactive with isocyanate groups.

Preferably, the diol A2 is a linear diol, in particular selected from the group consisting of 1,3-propanediol, 1,4-butanediol and 1,5-pentanediol. These diols are particularly easy to handle since they are not very hydrophilic and are liquid at room temperature and yield urethane groups during the curing of the adhesive, which favor high strength and good extensibility over a wide temperature range. Of these, 1,4-butanediol is most preferred.

The alkoxylated aromatic diol A3 is a polyether diol having an aromatic core, as it is obtainable in particular by the alkoxylation of an aromatic diol having two phenolic OH groups.

The alkoxylated aromatic diol A3 is preferably an ethoxylated and/or propoxylated and/or butoxylated aromatic diol, in particular an ethoxylated and/or propoxylated aromatic diol. These diols are particularly easily accessible.

Particularly preferably, the alkoxylated aromatic diol A3 is a propoxylated aromatic diol. These diols are hydrophobic and have very low viscosity, whereby easily processable adhesives having good resistance to moisture in the cured state are obtained.

The aromatic moiety of the alkoxylated aromatic diol A3 is preferably a benzene radical, naphthalene radical, diphenylmethane radical, 1,1-diphenylethane radical, 2,2-diphenylpropane radical, diphenylether radical, benzophenone radical, bis(phenyl)sulfone radical or biphenyl radical.

Of these, the diphenylmethane radical and the 2,2-diphenylpropane radical are preferred. These aromatic radicals are derived from bisphenol F or bisphenol A. Such alkoxylated aromatic diols A3 yield easily processable adhesives having particularly high strengths.

Particularly preferably, the alkoxylated aromatic diol A3 is a propoxylated bisphenol A or a propoxylated bisphenol F, in particular a propoxylated bisphenol A.

The alkoxylated aromatic diol A3 preferably has a molecular weight in the range of 350 to 500 g/mol. These diols A3 yield particularly high strengths.

Suitable as the aliphatic polyamine A4 are amines having two or three aliphatic amino groups, in particular the following commercially available polyamines:

aliphatic, cycloaliphatic or arylaliphatic primary diamines such as in particular ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethyl hexamethylene diamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, 1,4-diamino-2,2,6-trimethylcyclohexane (TMCDA), bis(4-aminocyclohexyl)methane ($H_{12}$-MDA), bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane (M-MECA), 1-amino-3-aminomethyl-3,5,5-trimethylcyclohexane (=isophorone diamine or IPDA), 2- and 4-methyl-1,3-diaminocyclohexane and mixtures thereof, 1,3- and 1,4-bis(aminomethyl)cyclohexane, 2,5(2,6)-bis(aminomethyl)bicyclo[2.2.1]heptane (NBDA), 3(4), 8(9)-bis(aminomethyl)tricyclo[5.2.1.$0^{2,6}$]decane, 1,8-menthanediamine, and 1,3- und 1,4-bis(aminomethyl)benzene;

ether group-containing aliphatic primary diamines, such as, in particular, bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine und higher oligomers of these diamines, 3,9-bis(3-aminopropyl)-2,4,8,10-tetraoxaspiro[5.5]undecane, bis(3-aminopropyl)polytetrahydrofuranes und other polytetrahydrofuran diamines, Jeffamine® RFD-270 (from Huntsman), and polyoxyalkylene diamines ("polyether diamines"). The latter are products obtained from the amination of polyoxyalkylene diols and are available, for example, under the name Jeffamine® (from Huntsman), under the name Polyetheramine (from BASF) or under the name PC Amine® (from Nitroil). Particularly suitable polyoxyalkylene diamines are Jeffamine® D-230, Jeffamine® D-400, Polyetheramine D 230, Polyetheramine D 400, PC Amines® DA 250 and PC Amine® DA 400; and polyoxyalkylene triamines ("Polyether triamines"), which are products from the amination of polyoxyalkylene triols and are available, for example, under the trade name Jeffamine® (from Huntsman), under the name Polyetheramine (from BASF) or under the name PC Amine® (from Nitroil), such as, in particular, Jeffamine® T-403, Polyetheramine T403, and PC Amine® TA 403.

Particularly preferably, the polyamine A4 is selected from the group consisting of 1,5-diamino-2-methylpentane, 2,2,4- and 2,4,4-trimethyl hexamethylene diamine, 1,8-octanediamine, 1,10-decanediamine, 1,12-dodecanediamine, 1-amino-3-aminomethyl-3,5,5-trimethylcyclohexane, 2- and 4-methyl-1,3-diaminocyclohexane and mixtures thereof, 1,3-bis(aminomethyl)cyclohexane, 1,4-bis(aminomethyl)cyclohexane, 2,5(2,6)-bis(aminomethyl)bicyclo[2,2,1]heptane, 3(4),8(9)-bis(aminomethyl)tricyclo[$5.2.1.0^{2,6}$]decane, bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3-10-diamine, 1,3-bis(aminomethyl)benzene and 1,4-bis(aminomethyl)benzene.

These polyamines are particularly easily accessible and in the reaction with isocyanates, these polyamines lead to urea groups, which phase separate particularly well. Adhesives produced therewith have particularly high strength, in particular high moduli of elasticity, and the mechanical properties are not very dependent on the temperature.

Of these, 1,3-bis(aminomethyl)cyclohexane, and 1,3-bis(aminomethyl)benzene are preferred, 1,3-bis(aminomethyl)benzene being most preferred. These polyamines can be used to produce cured adhesives having particularly high strengths.

The selection of the triol A1, the diol A2, the alkoxylated aromatic diol A3, and the polyamine A4 and the use thereof at certain, carefully matched ratios provides the adhesive with good processing properties and excellent strength in the cured state, with amorphous and crystalline regions being present with very good separation, and the mechanical properties are not being very dependent on the temperature, and the possibility being provided of thermal debonding of adhesive bonds in a temperature range of interest.

In the adhesive, the triol A1, the diol A2, and the alkoxylated aromatic diol A3 are present in a weight ratio A1/(A2+A3)≤10.

Preferably, the weight ratio A1/(A2+A3) is in the range of 3 to 10. Such adhesives have a particularly advantageous combination of strength and extensibility.

In the adhesive, the diol A2 is present in an amount such that the weight ratio A1/A2 between the triol A1 and the diol A2≤15.

Preferably, the weight ratio A1/A2 is 10 or below. Such an adhesive has high strength and good extensibility.

Particularly preferably, the weight ratio A1/A2 is in the range from 5 to 10. Such an adhesive has a particularly temperature-independent modulus of elasticity.

Preferably, the alkoxylated aromatic diol A3 is present in the adhesive in an amount such that the weight ratio A2/A3 is in the range from 0.5 to 7.5, in particular 1.5 to 7.4. Such adhesives have high strength and the ability to debond thermally.

In one aspect of the invention, the weight ratio A2/A3 is preferably 3.5 or below, particularly preferably in the range of 0.5 to 3.5, in particular in the range of 0.8 to 3. Such adhesives result in adhesive bonds which can be thermally debonded particularly well.

In a further aspect of the invention, the weight ratio A2/A3 is preferably 3.5 to 15, particularly preferably in the range of 3.5 to 7.5, and in particular in the range of 3.6 to 7.4. Such adhesives yield particularly high tensile shear strengths.

In a further aspect of the invention, the weight ratio A2/A3 is preferably 3.5 or below, particularly preferably in the range of 0.5 to 3.5, in particular in the range of 0.8 to 2. Such adhesives yield particularly high early strengths, which is particularly advantageous in automated bond connections since this allows early loading of the adhesive bond, which enables high cycle times. High values for the tensile shear strength during curing are a measure of high early strength.

Preferably, the polyamine A4 is present in the adhesive in an amount such that the weight ratio A1/(A2+A4) is in the range of 4.5 to 11. Such adhesives exhibit an easily manageable open time, and good stability during application.

Particularly preferably, the weight ratio A1/(A2+A4) is in the range from 4.5 to 6.5. These adhesives further have high strengths at room temperature and at 85° C., and a particularly small increase of Young's modulus between room temperature and −35° C.

Particularly suitable as the polyisocyanate B1 are monomeric diisocyanates or triisocyanates, and oligomers, polymers and derivatives of monomeric diisocyanates or triisocyanates, and any mixtures thereof.

Suitable aromatic monomeric diisocyanates or triisocyanates are in particular 2,4- and 2,6-tolylene diisocyanate and any mixtures of these isomers (TDI), 4,4'-, 2,4'- and 2,2'-diphenylmethane diisocyanate and any mixtures of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidine diisocyanate (DADI), 1,3,5-tris(isocyanatomethyl)benzene, tris(4-isocyanatophenyl)methane, and tris(4-isocyanatophenyl)-thiophosphate.

Suitable aliphatic monomeric diisocyanates or triisocyanates are in particular 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane and any mixtures of these isomers (HTDI or $H_6TDI$), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}MDI$), 1,4-diisocyanato-2,2,6-trimethylcyclohexane (TMCDI), 1,3-, and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, dimer and trimer fatty acid isocyanates such as 3,6-bis(9-isocyanatononyl)-4,5-di(1-heptenyl)cyclohexene (dimeryl diisocyanate) and α,α,α',α',α'',α''-hexamethyl-1,3,5-mesitylene triisocyanate.

Suitable oligomers, polymers, and derivatives of these monomeric diisocyanates and triisocyanates are in particular derived from MDI, TDI, HDI and IPDI. Of these, particularly suitable are commercially available types, especially HDI biurets such as Desmodur® N 100 and N 3200 (from Bayer), Tolonate® HDB and HDB-LV (from Rhodia) and Duranate® 24A-100 (from Asahi Kasei); HDI isocyanurates such as Desmodur® N 3300, N 3600 and N 3790 BA (all from Bayer), Tolonate® HDT, HDT-LV and HDT-LV2 (from Rhodia), Duranate® TPA 100 and THA-100 (from Asahi Kasei) and Coronate® HX (from Nippon Polyurethane); HDI uretdiones such as Desmodur® N 3400 (from Bayer); HDI iminooxadiazindiones such as Desmodur® XP 2410 (from Bayer); HDI allophanates such as Desmodur® VP LS 2102 (from Bayer); IPDI isocyanurates, for example in solution as Desmodur® Z 4470 (from Bayer) or in solid form as Vestanat® T1890/100 (from Degussa); TDI oligomers such as Desmodur® IL (from Bayer); and mixed isocyanurates based on TDI/HDI, for example, as Desmodur® HL (from Bayer). Furthermore, particular suitable are forms of MDI that are liquid at room temperature (so-called "modified MDI"), which are mixtures of MDI with MDI derivatives, in particular MDI carbodiimides or MDI-uretonimines or MDI urethanes, known under trade names such as Desmodur® CD, Desmodur® PF, Desmodur® PC (all from Bayer) or Isonate® M 143 (from Dow), and mixtures of MDI and MDI homologs (polymeric MDI or PMDI), available under trade names such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 and Voranate® M 580 (all from Dow) or Lupranat® M 10 R (from BASF). In practice, the aforementioned oligomeric polyisocyanates are usually mixtures of substances having different degrees of oligomerization and/or chemical structures. Preferably, they have an average NCO functionality of 2.1 to 4.0.

Preferred as the polyisocyanate B1 are forms of MDI that are liquid at room temperature. These are in particular so-called polymeric MDI and MDI having fractions composed of oligomers or derivatives thereof. The content of MDI (=4,4'-, 2,4'- and 2,2'-diphenylmethane diisocyanate and any mixtures of these isomers) of such liquid forms of MDI is in particular 50 to 95% by weight, in particular 60 to 90% by weight.

Particularly preferred as the polyisocyanate B1 is polymeric MDI, and in particular MDI types that are liquid at room temperature and contain fractions composed of MDI carbodiimides or the adducts thereof.

Particularly good processing properties and particularly high strengths are obtained with these polyisocyanates B1.

The polyurethane polymer B2 preferably has 50 to 95% by mass, in particular 70 to 90% by mass, polyoxyalkylene units, particularly preferably polyoxyethylene and/or polyoxypropylene units, in particular polyoxypropylene units. Such a polyurethane polymer has low viscosity and allows for good extensibility.

The polyurethane polymer B2 preferably has an average molecular weight of 1,000 to 20,000 g/mol, particularly preferably of 2,000 to 10,000 g/mol.

The polyurethane polymer B2 preferably has a mean NCO functionality in the range of 1.7 to 3, in particular 1.8 to 2.5. Such a polyurethane polymer allows for good processing properties and good mechanical properties in the cured state.

Particularly preferably, the polyurethane polymer B2 has a mean NCO functionality in the range of 2.05 to 2.5. Such a polyurethane polymer allows for good extensibility and high strength.

The polyurethane polymer B2 preferably has a free isocyanate group content of 1 to 10% by weight, particularly preferably of 1 to 5% by weight.

The urethane groups and the free isocyanate groups of polyurethane polymer B2 are preferably derived from 4,4'-diphenylmethane diisocyanate. In this way, particularly good hard segments are obtained during curing of the adhesive, and thus particularly high strengths are obtained.

A suitable polyurethane polymer B2 having isocyanate groups can be obtained from the reaction of at least one polyisocyanate with at least one polyol. This reaction may take place in that the polyol and the polyisocyanate are caused to react using typical processes, for example at temperatures of 50° C. to 100° C., optionally with the concomitant use of suitable catalysts, wherein the polyisocyanate is metered in such a way that the isocyanate groups thereof are present in stoichiometric excess in relation to the hydroxyl groups of the polyol. Advantageously the polyisocyanate is metered in such a way that an NCO/OH ratio of 1.3 to 5, in particular one of 1.5 to 3, is observed. The "NCO/OH ratio" shall be understood to mean the ratio of the number of isocyanate groups used to the number of hydroxyl groups used.

Particularly suitable polyols for the preparation of a polyurethane polymer B2 are the following commercially available polyols or mixtures thereof:

Polyoxyalkylene polyols, also referred to as polyether polyols or oligoetherols, which are polymerization products of ethylene oxide, 1,2-propylene, 1,2- or 2,3-butylene oxide, oxetane, tetrahydrofuran or mixtures thereof, optionally polymerized using a starter molecule having two or more active hydrogen atoms such as water, ammonia or compounds having several OH or NH groups such as 1,2-ethanediol, 1,2-, and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonandiols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline and mixtures of the aforementioned compounds. It is possible to use both polyoxyalkylene polyols having a low degree of unsaturation (measured according to ASTM D-2849-69 and expressed in milliequivalents of unsaturation per gram of polyol (meq/g)), prepared, for example, using so-called double metal cyanide complex catalysts (DMC catalysts), and polyoxyalkylene polyols having a higher degree of unsaturation, prepared, for example, using anionic catalysts such as NaOH, KOH, CsOH or alkali alkoxides.

Polyoxyalkylene diols or polyoxyalkylene triols, in particular polyoxyethylene and polyoxypropylene diols and triols, are particularly suitable.

Polyoxyalkylene diols and triols having a degree of unsaturation less than 0.02 meq/g and having a molecular weight in the range of 1,000 to 30,000 g/mol, and polyoxypropylene diols and triols having a molecular weight of 400 to 8,000 g/mol are especially suitable.

So-called ethylene oxide-terminated ("EO endcapped", ethylene oxide-endcapped) polyoxypropylene polyols are particularly suitable.

Styrene-acrylonitrile- or acrylonitrile-methyl methacrylate-grafted polyether polyols.

Polyester polyols, also referred to as oligoesterols, prepared by known methods, in particular by the polycondensation of hydroxycarboxylic acids or the polycondensation of aliphatic and/or aromatic polycarboxylic acids with di- or polyhydric alcohols.

Particularly suitable polyester polyols are those which are produced from dihydric to trihydric, in particular dihydric alcohols, such as ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexanedimethanol, dimer fatty acid diol (dimerdiol), hydroxypivalic acid neopentyl glycol ester, glycerol, 1,1,1-trimethylolpropane or mixtures of the aforementioned alcohols, and organic dicarboxylic or tricarboxylic acids, in particular dicarboxylic acids or the anhydrides or esters thereof, such as succinic acid, glutaric acid, adipic acid, trimethyladipic acid, suberic acid, azelaic acid, sebacic acid, dodecane dicarboxylic acid, maleic acid, fumaric acid, dimer fatty acid, phthalic acid, isophthalic acid, terephthalic acid, dimethyl terephthalate, hexahydrophthalic acid, trimellitic acid and trimellitic anhydride, or mixtures of the aforementioned acids, and polyester polyols from lactones such as ε-caprolactone and starters such as the aforementioned dihydric or trihydric alcohols.

Polyester diols are particularly suitable polyester polyols.

Polycarbonate polyols, such as those accessible, for example, by reacting the aforementioned alcohols—used to synthesize the polyester polyols—with dialkyl carbonates, diaryl carbonates or phosgene.

Block copolymers carrying at least two hydroxyl groups and including at least two different blocks having a polyether, polyester and/or polycarbonate structure of the type described above, in particular polyether polyester polyols.

Polyacrylate and polymethacrylate polyols.

Polyhydroxy-functional fats and oils, for example natural fats and oils, in particular castor oil; or—so-called oleochemical—polyols obtained by the chemical modification of natural fats and oils, for example, epoxy-polyesters or epoxypolyethers obtained by the epoxidation of unsaturated oils and subsequent ring opening with carboxylic acids or alcohols, or polyols obtained by the hydroformylation and hydrogenation of unsaturated oils; or polyols obtained from natural fats and oils by degradation processes such as alcoholysis or ozonolysis and subsequent chemical linkage, for example, by transesterification or dimerization, of the degradation products or derivatives thereof thus obtained. Suitable degradation products of natural fats and oils are in particular fatty acids and fatty alcohols, and fatty acid esters, in particular the methyl esters (FAME), which can be derivatized, for example, by hydroformylation and hydrogenation to form hydroxy fatty acid esters.

Polyhydrocarbon polyols, also referred to as oligohydrocarbonols such as polyhydroxy-functional polyolefins, polyisobutylenes, polyisoprenes; polyhydroxy-functional ethylene-propylene-, ethylene-butylene- or ethylene-propylene-diene copolymers, for example, those made by Kraton Polymers; polyhydroxy-functional polymers from dienes, in particular 1,3-butadiene, which may be prepared in particular also by anionic polymerization; polyhydroxy-functional copolymers of dienes such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers, such as those that can be produced from epoxides or amino alcohols and carboxyl-terminated acrylonitrile/butadiene copolymers (for example, commercially available under the name Hypro® (formerly Hycar®) CTBN and CTBNX and ETBN from Nanoresins AG, Germany, or Emerald Performance Materials LLC); and hydrogenated polyhydroxy-functional polymers or copolymers of dienes.

Preferred polyols for the preparation of a polyurethane polymer B2 are polyoxyalkylene polyols, polyester polyols, polycarbonate polyols and polyacrylate polyols. Polyoxyalkylene polyols, in particular polyoxypropylene polyols and mixed polyoxyethylene-polyoxypropylene polyols, are particularly preferred.

The polyol for the preparation of a polyurethane polymer B2 preferably has a molecular weight of 500 to 20,000 g/mol, in particular of 1,000 to 8,000 g/mol.

The polyol for the preparation of a polyurethane polymer B2 is preferably a diol, or a mixture of at least one diol and at least one triol, in particular a mixture of at least one diol and at least one triol.

Suitable polyisocyanates for the preparation of a polyurethane polymer B2 are in particular the following commercially available polyisocyanates or mixtures thereof: 2,4- and 2,6-tolylene diisocyanate and any mixtures of these isomers (TDI), 4,4'-, 2,4'- and 2,2'-diphenylmethane diisocyanate and any mixtures of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), 1,3,5-tris(isocyanatomethyl)benzene, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane, and mixtures of these isomers (HTDI or H$_6$TDI), 1-isocyanato-3,3,5-trimethyl-5-isocyanatomethyl cyclohexane (=isophorone diisocyanate or IPDI), perhydro-2,4'- and -4,4'-diphenylmethane diisocyanate (HMDI or H$_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI) and m- and p-tetramethyl-1,3- and -1,4-xylylene diisocyanate (m- and p-TMXDI). MDI, TDI, IPDI, and HDI are preferred. MDI is particularly preferred. 4,4'-diphenylmethane diisocyanate is most preferred. Using this MDI isomer, particularly good hard segments, and thus particularly high strengths, are obtained during curing with the diols A2 and polyamines A4.

The polyisocyanate B1 and the polyisocyanate used to prepare polyurethane prepolymer B2 are preferably different types of polyisocyanate.

Particularly preferably, the polyisocyanate B1 is an MDI that is liquid at room temperature, and the polyisocyanate used to prepare the polyurethane polymer B2 is 4,4'-diphenylmethane diisocyanate, which typically is solid at room temperature. Thus, the second component is liquid at room temperature, which allows easy processing, and enables particularly good mechanical properties. A defined mixture of polyisocyanate B1 and polyurethane polymer B2 can be achieved by first preparing the polyurethane polymer B2 separately before mixed it with the polyisocyanate B1.

Thus, preferably, the preparation of the polyurethane polymer B2 does not take place in the presence of the polyisocyanate B1.

The weight ratio between the polyisocyanate B1 and the polyurethane polymer B2 is preferably 0.25 to 4, preferably 0.25 to 2, particularly preferably 0.3 to 1.5, and in particular 0.4 to 1.0. Such a second component makes adhesives having good processability, high strength and high elongation possible.

Additionally, the polyurethane adhesive may contain further substances that can react with isocyanate groups as part of the first component.

In particular, the first component may contain at least one polyol and/or at least one low molecular weight dihydric or polyhydric alcohol, which has been mentioned for the preparation of the polyurethane polymer B2.

Furthermore, the polyurethane adhesive may contain catalysts that accelerate the reaction of hydroxyl groups with isocyanate groups, in particular organotin, organozinc and organobismuth metal catalysts, for example dibutyltin dilaurate, or tertiary amines, amidines or guanidines, for example, 1,4-diazabicyclo[2.2.2]octane (DABCO) or 1,8-diazabicyclo[5.4.0]undec-7-ene (DBU).

In addition to those mentioned above, the polyurethane adhesive may contain further constituents that are commonly used in two-component polyurethane compositions, in particular the following:
- plasticizers;
- solvents;
- inorganic and organic fillers;
- fibers, for example made of polyethylene;
- pigments;
- rheology modifiers, in particular thickeners or thixotropic agents;
- drying agents;
- adhesive promoters;
- stabilizers against oxidation, heat, light and UV radiation;
- flame retardant substances;
- surface-active substances, in particular wetting agents, flow control agents, deaerating agents or defoamers;
- biocides such as algicides, fungicides or fungal growth inhibitors.

When using other constituents of the polyurethane adhesive it is advantageous to ensure that they do not significantly impair the storage stability of the particular component. If such substances are to be stored together with isocyanates, this means in particular that they should not contain any, or at most traces of, water. It may be useful to chemically or physically dry certain constituents before mixing them in.

The components of the polyurethane adhesive are advantageously formulated such that the mixing ratio of the volumes of the first and second components is in the range of 1:3 to 3:1, in particular 1:2 to 2:1. Preferably, this ratio is approximately 1:1.

The mixing ratio is preferably set such that, in the mixed polyurethane adhesive, the ratio of the number of isocyanate groups to the number of isocyanate-reactive groups, in particular the sum of OH and $NH_2$ groups, prior to curing is approximately in the range of 1.2 to 1, preferably 1.1 to 1.

The two components are prepared separately of one another and, at least for the second component, typically in the absence of moisture. Typically, the components are stored in each case in a separate container. The further constituents of the polyurethane adhesive may be present as part of the first or second component, wherein further isocyanate group-reactive constituents preferably are part of the first component. A suitable container for storing each component is in particular a drum, a hobbock, a bag, a bucket, a can, a cartridge or a tube.

Prior to the application, the two components are stored separately from each other and are mixed with one another only during or immediately prior to the application. The components are advantageously present in a packaging composed of two separate chambers.

In a further aspect, the invention comprises a package composed of a packaging having two separate chambers, which each contain one of the two components of the polyurethane adhesive.

Preferred packages of this kind are, on the one hand, side-by-side double cartridges or coaxial cartridges, in which two tubular chambers are arranged next to or inside one another and are sealed air-tight and moisture-tight by a piston. By advancing these pistons, the components can be pressed out of the cartridge. The sides of the tubes opposite to the piston, where appropriate, are modified via an adapter, so that the chamber openings are connected directly to one another in the area of the opening by a partition wall. Advantageously, a thread is provided in the area of the outlet opening of the chambers, so that a static mixer or a dynamic mixer can be mounted tightly thereon. Such packages are particularly preferred for small applications, in particular for loads of up to 1 liter.

For applications in large quantities, especially for applications in industrial production, advantageously, the two components are filled and stored in drums or hobbocks. During application, the components are pressed out by means of feed pumps, and metered addition takes place via lines of a mixing apparatus, such as those commonly used for two-component adhesives in industrial production.

The mixing is typically done via static mixers or by means of dynamic mixers. When mixing, care must be taken to ensure that the two components are mixed as homogeneously as possible. If the two components are poorly mixed, local variances from the advantageous mixing ratio will occur, which may cause a deterioration of the mechanical properties. In order to control the mixing quality visually, it can be advantageous if the two components have two different colors. Good mixing is deemed to exist when the mixed adhesive has a homogeneously blended color, without visible streaks or smears.

Upon contact of the first component with isocyanate groups of the second component, curing begins by chemical reaction. Here, the amino groups of the polyamine A4 and the hydroxyl groups of the triol A1, the diol A2, and the diol A3 and optionally present further isocyanate group-reactive substances react with the isocyanate groups that are present. Excess isocyanate groups react with moisture that is present. As a result of these reactions, the polyurethane adhesive cures to from a solid material. This process is also referred to as crosslinking.

Another aspect of the present invention relates to a method for bonding a first substrate to a second substrate, comprising the following steps:
- mixing the two components described above,
- applying the mixed polyurethane adhesive to at least one of the substrate surfaces to be bonded, joining the substrates to be bonded within the open time, curing the polyurethane adhesive.

The two substrates can be made of the same material or different materials. This method results in an adhesive bond.

In this method for bonding, suitable substrates are in particular
- glass, glass ceramics;
- metals and alloys, such as aluminum, iron, steel and nonferrous metals, as well as surface-finished metals and alloys such as galvanized or chrome-plated metals;
- coated and painted substrates, such as powder-coated metals or alloys and painted sheet metals;
- plastic materials, such as polyvinyl chloride (hard and soft PVC), acrylonitrile-butadiene-styrene copolymers (ABS), polycarbonate (PC), polyamide (PA), polyesters, poly(methylmethacrylate) (PMMA), polyester, epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), wherein the plastic materials may be surface-treated, preferably by way of plasma, corona or flame;
- fiber-reinforced plastic materials, such as carbon fiber-reinforced plastic materials (CFRP), glass fiber-reinforced plastic materials (GRP) and sheet molding compounds (SMC);
- wood, derived timber products bound with resins, such as phenolic, melamine or epoxy resins, resin-textile composites and other so-called polymer composites; and
- concrete, mortar, brick, clay brick, gypsum and natural stones such as granite or marble.

In this method, one substrate is, or both substrates are, preferably a metal or a ceramic or a glass fiber-reinforced plastic material or a carbon fiber-reinforced plastic material.

If necessary, the substrates may be pretreated before applying the adhesive. Such pretreatments include in particular physical look and/or chemical cleaning methods, and applying an adhesive promoter, an adhesive promoter solution or a primer.

This described method for bonding results in an article, in which the adhesive connects two substrates to one another in a force-fit manner. This article is in particular a structure, such as a bridge, an industrial item or a consumer item, in particular a window, a rotor blade of a wind turbine or a means of transport, in particular a vehicle, preferably an automobile, a bus, a truck, a train or a boat, as well as an airplane or a helicopter; or attachment of such an article.

The invention further relates to an article obtained from the method for bonding described above.

It may be advantageous if the method for bonding, after the step of
- curing the polyurethane adhesive
  - includes a further step of
- heating the adhesive bond containing the cured polyurethane adhesive for detaching or debonding the adhesive bond.

The heating is preferably carried out here at a temperature of at least 120° C., preferably in the range of 140° C. to 200° C., particularly preferably in the range of 150 to 160° C., for a period of at least 10 minutes, preferably at least 20 minutes, particularly preferably for 20 to 180 minutes, most preferably for 25 to 45 minutes.

Heating is done in particular by means of infrared radiator, hot-air dryer, induction heater or in an oven.

Heating leads to a weakening of the cured adhesive in terms of the strength thereof. Thus, the substrates can be mechanically separated from the adhesive using a relatively small expenditure of force, i.e., the adhesive bond is easily detachable. Little expenditure of force refers here to less than 2 MPa, in particular a force in the range of 1.5 to 0.2 MPa.

Particularly good properties for debonding are exhibited by adhesives that contain a certain amount of alkoxylated aromatic diol A3, in particular, such adhesives in which the weight ratio A2/A3 is 3.5 or below.

The possibility of thermally detaching adhesive bonds is very advantageous in particular when repairing a bonded workpiece, as damaged or defective bonded substrates can be replaced easily by heating the adhesive bond. For example in a vehicle, the parts of which are connected by an adhesive according to the invention, a single adhesive bond can be selectively heated and thus detached, without impairing the rest of the vehicle.

The described polyurethane adhesive has very good properties as a structural adhesive.

In this case, a structural adhesive refers to an adhesive which forms part of the supporting structure of the bonded components in the cured state. Thus, the structural adhesive is an important link of the construction within which it connects two components or substrates. Accordingly, high demands are placed on the mechanical properties thereof.

Another important property of a structural adhesive is the good processability thereof. Here, the two components, individually and during mixing, should have a low viscosity so that they are easily to handle and mix, but then very quickly develop such a viscosity that immediately a shear-thinning, stable material is obtained, so that layer thicknesses up to 10 mm and more can be applied.

Using the described polyurethane adhesive, these requirements can be met particularly well.

EXAMPLES

Exemplary embodiments are shown below, which are intended to illustrate the described invention in more detail. Of course, the invention is not limited to the described exemplary embodiments.

1. Substances Used:

| | |
|---|---|
| Polyisocyanate | modified diphenylmethane diisocyanate, containing MDI carbodiimide adducts, liquid at room temperature, NCO content 29.4% by weight (Isonate ® M 143 from Dow) |
| Triol 1 | EO-endcapped polyoxypropylene triol, OH number 34.7 mg KOH/g (Voranol ® CP 4755 from Dow) |
| Triol 2 | Polyoxypropylene triol, OH number 400 mg KOH/g (Lupranol 3300 from BASF) |
| MXDA | 1,3-bis(aminomethyl)benzene, OH number 34.7 mg KOH/g |
| Propoxylated BPA | Propoxylated bisphenol A, OH number 280 mg KOH/g (Simusol ™ BPIP/P from Seppic) |
| DABCO | 1,4-diazabicyclo[2.2.2]octane, 33.0% by weight in dipropylene glycol (DABCO 33 LV ® from Air Products) |
| Silica | fumed silica, hydrophobic modification |

Polymer 1 was prepared by reacting 1300 g of polyoxypropylene diol (Acclaim® 4200 N from Bayer; OH number 28.5 mg KOH/g), 2600 g of polyoxypropylene polyoxyethylene triol (Caradol® MD34-02 from Shell; OH number 35.0 mg KOH/g), 600 g of 4,4'-methylenediphenyl diisocyanate (Desmodur® 44 MC L, from Bayer) and 500 g of diisodecyl phthalate according to a known method at 80° C. to give an NCO-terminated polyurethane polymer having a content of free isocyanate groups of 2.1% by weight.

2. Preparation of Polyurethane Adhesives

For each adhesive, the ingredients specified in Tables 1 and 2 were processed in the amounts indicated (in parts by weight) for the first component ("component 1") by means of a vacuum dissolver in the absence of moisture to form a homogeneous paste and stored. Likewise, the ingredients of the second component ("component 2") specified in Tables 1 and 2 were processed and stored. Then, the two components were processed for 30 seconds to form a homogeneous paste using a SpeedMixer® (DAC 150 FV, Hauschild), and the paste was tested immediately as follows:

To determine the mechanical properties, the adhesive was shaped as a dumbbell according to ISO 527, part 2, 1B and was stored or cured for 24 h at 25° C. and then for 3 h at 80° C.

After a conditioning time of 24 hours at the temperature (−35° C. or 23° C. or 85° C.) specified in Tables 1 and 2, the modulus of elasticity in the range of 0.05 to 0.25% elongation ("Young's modulus"), the tensile strength and the elongation at break of the specimens thus prepared were measured in each case according to ISO 527 on a Zwick tensile testing machine Z020 at the temperature specified in the table and a test speed of 50 mm/min.

For measuring the tensile shear strength, several test specimens were prepared, wherein 1 minute after completion of the mixing time. The adhesive was applied between two cataphoretically painted steel sheets that were degreased with isopropanol, in a layer thickness of 2.0 mm, and to an overlapping adhesive surface 15×45 mm. The tensile shear strength of these test specimens was determined according to DIN EN 1465, wherein the test specimens were stored under different conditions before the measurement: either for 1 h at 23° C.; or for 3 h at 23° C., or for 12 h at 23° C., then for 3 hours at 80° C. and then conditioned for 24 h at 23° C. The results are shown in Tables 1 and 2.

The information A1/(A2+A3), A1/A2, A2/A3 and A1/(A2+A4) in Tables 1 and 2 refers to the weight ratios of the triols A1, diols A2, alkoxylated aromatic diols A3 and polyamines A4 that are present in the respective adhesive.

Table 3 shows tests for debonding. For this purpose, adhesives EZ 1 to EZ 3, Ref. 1 and Ref. 3 were used to prepare adhesive bonds in the form of test specimens for determining the tensile shear strength, as described previously. All test specimens were stored for 12 h at 23° C., then for 3 h at 80° C., and then conditioned for 24 hours at 23° C. before they were each heated differently in an oven, as indicated in Table 3. After the heat treatment, the test specimens were conditioned for 24 hours at 23° C., and then the tensile shear strength was determined.

Figure 1:
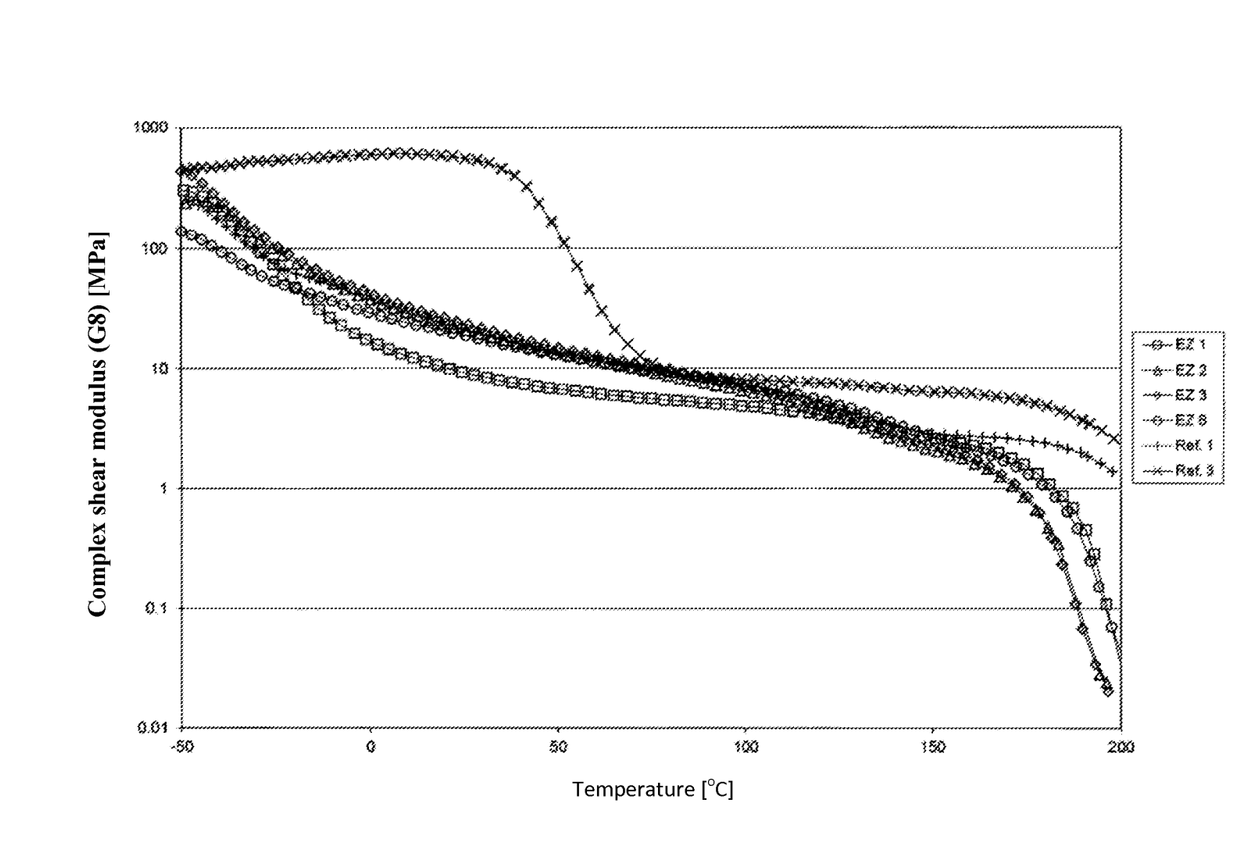

The FIGURE shows DMTA measurements of films cured for 7 days under standard conditions (23° C., 50% relative humidity), carried out using a Mettler DMA/SDTA 861e. The measurement conditions were: Measurement in shear, 10 Hz excitation frequency and heating rate of 5 K/min. The test specimens were disc-shaped samples (thickness 2-3 mm, diameter 10 mm). These were cooled to −60° C. and then heated to 200° C. while determining the complex shear modulus G* [MPa].

Adhesives EZ-1 to EZ-6 are examples according to the invention, adhesives Ref. 1 to Ref. 5 are comparative examples.

Immediately after mixing of the two components, all of the adhesives prepared showed a stable consistency.

One minute after completion of the mixing time of the two components, adhesive EZ-3 was applied to a glass fiber-reinforced plastic plate that was previously degreased with isopropanol and covered with a second identical plate, forming an overlapping adhesive area of 15×45 mm at a layer thickness of 2 mm, cured for 24 h at 23° C. and, then for 3 hours at 80° C., and after a conditioning time of 24 h at 23° C., the tensile shear strength was determined as previously described, resulting in a cohesive fracture pattern.

Likewise, two carbon fiber-reinforced plastic plates were bonded with adhesive EZ-3 and the tensile shear strength was determined at 23° C., resulting in a cohesive fracture pattern.

TABLE 1

Composition and properties of EZ 1 to EZ 6 (amounts in parts by weight)

| Adhesive | EZ 1 | EZ 2 | EZ 3 | EZ 4 | EZ 5 | EZ 6 |
|---|---|---|---|---|---|---|
| Component 1 | | | | | | |
| Triol 1 | 52.5 | 50.5 | 51.5 | 50.5 | 52.0 | 53.5 |
| 1,4-Butanediol | 3.5 | 7.1 | 7.3 | 7.5 | 7.4 | 6.5 |
| Propoxylated BPA | 4.0 | 4.0 | 2.0 | 2.0 | 1.0 | 1.0 |
| MXDA | 1.7 | 1.7 | 1.7 | 1.7 | 1.7 | 1.7 |
| DABCO | 0.3 | 0.3 | 0.3 | 0.3 | 0.3 | 0.3 |
| Calcined kaolin | 34.0 | 32.9 | 33.7 | 34.0 | 33.6 | 32.6 |
| Molecular sieve | 4.0 | 3.5 | 3.5 | 4.0 | 4.0 | 4.0 |
| Component 2 | | | | | | |
| Polyisocyanate | 22.9 | 34.8 | 34.0 | 34.4 | 34.0 | 30.4 |
| Polymer 1 | 32.7 | 49.7 | 48.6 | 49.2 | 48.6 | 43.5 |
| Silica | 2.3 | 3.5 | 3.4 | 3.5 | 3.4 | 3.1 |
| −35° C.: Tensile strength [MPa] | 37 | 41 | 38 | 39 | 38 | n.d. |
| Elongation at break [%] | 246 | 216 | 220 | 195 | 219 | n.d. |
| Young's modulus [MPa] | 152 | 253 | 210 | 245 | 205 | n.d. |
| 23° C.: Tensile strength [MPa] | 11 | 15 | 13 | 14 | 13 | n.d. |
| Elongation at break [%] | 193 | 249 | 255 | 224 | 238 | n.d. |
| Young's modulus [MPa] | 18 | 42 | 39 | 41 | 35 | n.d. |
| 85° C.: Tensile strength [MPa] | 5 | 7 | 6 | 7 | 6 | n.d. |
| Elongation at break [%] | 96 | 127 | 134 | 115 | 116 | n.d. |
| Young's modulus [MPa] | 13 | 23 | 16 | 23 | 21 | n.d. |
| Tensile shear strength [MPa] | | | | | | |
| after 1 h 23° C. | 0.7 | 1.3 | 0.7 | 0.4 | 0.5 | n.d. |
| after 3 h 23° C. | 4.0 | 3.4 | 2.5 | 2.0 | 2.8 | n.d. |
| after 12 h 23° C. and 3 h 80° C. | 8.5 | 7.4 | 10.5 | 10.5 | 10.4 | n.d. |
| A1/(A2 + A3) | 7.0 | 4.6 | 5.5 | 5.3 | 6.2 | 7.1 |
| A1/A2 | 15.0 | 7.1 | 7.1 | 6.7 | 7.0 | 8.2 |
| A2/A3 | 0.9 | 1.8 | 3.7 | 3.8 | 7.4 | 6.5 |
| A1/(A2 + A4) | 10.1 | 5.8 | 5.7 | 5.5 | 5.7 | 6.5 |

"n.d." means "not determined"

TABLE 2

Composition and properties of Ref. 1 to Ref. 5 (amounts in parts by weight)

| Adhesive | Ref. 1 | Ref. 2 | Ref. 3 | Ref. 4 | Ref. 5 |
|---|---|---|---|---|---|
| Component 1 | | | | | |
| Triol 1 | 52.2 | 52.5 | — | 44.3 | 52.5 |
| Triol 2 | — | — | 26.0 | — | — |
| 1,4-Butanediol | 7.4 | — | — | 15.3 | — |
| 2-Ethyl-1,3-hexanediol | — | — | — | — | 7.4 |
| Propoxylated BPA | — | 7.4 | 15.0 | — | — |
| MXDA | 2.0 | 2.0 | 1.0 | 2.0 | 2.0 |
| DABCO | 0.2 | 0.2 | 0.2 | 0.2 | 0.2 |
| Calcined kaolin | 34.2 | 33.9 | 50.8 | 33.3 | 33.3 |
| Molecular sieve | 4.0 | 4.0 | 7.0 | 4.9 | 4.9 |
| Component 2 | | | | | |
| Polyisocyanate | 33.2 | 14.2 | 27.7 | 58.1 | 24.5 |
| Polymer 1 | 47.5 | 20.3 | 39.6 | 83.1 | 35.0 |
| Silica | 3.4 | 1.4 | 2.8 | 5.9 | 2.5 |
| −35° C.: Tensile strength [MPa] | 34 | 42 | n.d. | 34 | 40 |

TABLE 2-continued

Composition and properties of Ref. 1 to Ref. 5 (amounts in parts by weight)

| Adhesive | Ref. 1 | Ref. 2 | Ref. 3 | Ref. 4 | Ref. 5 |
|---|---|---|---|---|---|
| Elongation at break [%] | 233 | 257 | n.d. | 134 | 199 |
| Young's modulus [MPa] | 196 | 90 | n.d. | 309 | 355 |
| 23° C.: Tensile strength [MPa] | 13 | 9 | n.d. | 15 | 10 |
| Elongation at break [%] | 234 | 196 | n.d. | 191 | 194 |
| Young's modulus [MPa] | 52 | 11 | n.d. | 91 | 14 |
| 85° C.: Tensile strength [MPa] | 6 | 4 | n.d. | 8 | 5 |
| Elongation at break [%] | 98 | 94 | n.d. | 139 | 81 |
| Young's modulus [MPa] | 21 | 11 | n.d. | 37 | 11 |
| Tensile shear strength [MPa] | | | | | |
| after 1 h 23° C. | 0.5 | 0.7 | n.d. | n.d. | n.d. |
| after 3 h 23° C. | 2.7 | 5.1 | n.d. | n.d. | n.d. |
| after 12 h 23° C. and 3 h 80° C. | 9.6 | 6.9 | n.d. | 6.8 | 6.8 |
| A1/(A2 + A3) | 7.1 | 7.1 | — | 2.9 | — |
| A1/A2 | 7.1 | — | — | 2.9 | 7.1 |
| A2/A3 | — | 0 | 0 | — | — |
| A1/(A2 + A4) | 5.6 | — | — | 2.6 | — |

"n.d." means "not determined"

TABLE 3

| Tensile shear strength: [MPa] | EZ 1 | EZ 2 | EZ 3 | Ref. 1 | Ref. 3 |
|---|---|---|---|---|---|
| after 30 min 120° C. | 7.6 | 10.0 | 10.0 | 10.2 | 9.3 |
| after 30 min 140° C. | 3.8 | 7.5 | 7.4 | 9.0 | 8.9 |
| after 30 min 150° C | 0.6 | 1.5 | 0.9 | 1.6 | n.d |
| after 30 min 160° C. | 0.4 | 1.0 | 0.6 | 0.6 | 8.4 |
| after 30 min 180° C. | 0.3 | 0.8 | 0.2 | 0.5 | 4.8 |

From Table 3 and the FIGURE it can be seen that thermal destabilization occurs with the adhesives according to the invention at temperatures above 140° C., which cannot be detected to the same extent in adhesives Ref. 1 and Ref. 3.

The invention claimed is:

1. A polyurethane adhesive comprising a first and a second component, wherein
the first component consists essentially of:
   a) at least one triol A1 having a molecular weight in the range of 1,000 g/mol to 10,000 g/mol,
   b) at least one diol A2 having two primary hydroxyl groups and a molecular weight in the range of 60 g/mol to 150 g/mol, and
   c) at least one alkoxylated aromatic diol A3 having a molecular weight in the range of 300 g/mol to 1,000 g/mol; and
   d) at least one aliphatic polyamine A4 having a molecular weight in the range of 60 g/mol to 500 g/mol; and
the second component comprises:
   e) at least one polyisocyanate B1 and
   f) at least one polyurethane polymer B2 having isocyanate groups;
wherein the triol A1, the diol A2 and the alkoxylated diol A3 are present in such an amount that
   g) the weight ratio A1/(A2+A3)≤10,
   h) the weight ratio A1/A2≤15, and
   i) the weight ratio A2/A3 is in the range of 0.5 to 7.5.

2. The polyurethane adhesive according to claim 1, wherein the triol A1 is a polyether triol.

3. The polyurethane adhesive according to claim 1, wherein the triol A1 has primary hydroxyl groups.

4. The polyurethane adhesive according to claim 1, wherein the diol A2 is selected from the group consisting of 1,3-propanediol, 1,4-butanediol and 1,5-pentanediol.

5. The polyurethane adhesive according to claim 1, wherein the alkoxylated aromatic diol A3 is an ethoxylated and/or propoxylated and/or butoxylated aromatic diol.

6. The polyurethane adhesive according to claim 5, wherein the alkoxylated aromatic diol A3 is a propoxylated bisphenol A or a propoxylated bisphenol F.

7. The polyurethane adhesive according to claim 1, wherein the polyamine A4 is selected from the group consisting of 1,5-diamino-2-methylpentane, 2,2,4- and 2,4,4-trimethylhexamethylene diamine, 1,8-octanediamine, 1,10-decanediamine, 1,12-dodecanediamine, 1-amino-3-aminomethyl-3,5,5-trimethylcyclohexane, 2- and 4-methyl-1,3-diaminocyclohexane and mixtures thereof, 1,3-bis(aminomethyl)cyclohexane, 1,4-bis(aminomethyl)cyclohexane, 2,5(2,6)-bis(aminomethyl)bicyclo[2,2,1]heptane, 3(4),8(9)-bis(aminomethyl)tricyclo[5.2.1.0$^{2,6}$]decane, bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 1,3-bis(aminomethyl)benzene and 1,4-bis(aminomethyl)benzene.

8. The polyurethane adhesive according to claim 1, wherein the weight ratio A1/(A2+A3) is in the range of 3 to 10.

9. The polyurethane adhesive according to claim 1, wherein the weight ratio A1/A2 is in the range of 5 to 10.

10. The polyurethane adhesive according to claim 1, wherein the polyisocyanate B1 is a form of 4,4'-, 2,4'- and 2,2'-diphenylmethane diisocyanate that is liquid at room temperature and arbitrary mixtures of these isomers (MDI) in the form of polymeric MDI or MDI having fractions of oligomers or derivatives.

11. The polyurethane adhesive according to claim 1, wherein the urethane groups and the free isocyanate groups of the polyurethane polymer B2 are derived from 4,4'-diphenylmethane diisocyanate.

12. A method for bonding a first substrate to a second substrate, the method comprising the following steps:
mixing of the two components of a polyurethane adhesive according to claim 1,
applying the mixed polyurethane adhesive to at least one of the substrate surfaces to be bonded,
joining the substrates to be bonded within the open time, and
curing the polyurethane adhesive.

13. The method according to claim 12, wherein one substrate is, or both substrates are, a metal or a ceramic or a glass fiber-reinforced plastic material or a carbon fiber-reinforced plastic material.

14. An article obtained from the method for bonding according to claim 12.

* * * * *